United States Patent
Kim et al.

(10) Patent No.: US 7,460,196 B2
(45) Date of Patent: Dec. 2, 2008

(54) BACKLIGHT DEVICE FOR LIQUID CRYSTAL DISPLAY AND METHOD OF FABRICATING THE SAME

(75) Inventors: Jae Bum Kim, Kyongsangbuk-do (KR); Seung Hoon Yang, Taegu-kwangyokshi (KR)

(73) Assignee: LG Displays Co., Ltd., Seoul (KR)

( * ) Notice: Subject to any disclaimer, the term of this patent is extended or adjusted under 35 U.S.C. 154(b) by 252 days.

(21) Appl. No.: 10/668,151

(22) Filed: Sep. 24, 2003

(65) Prior Publication Data
US 2004/0061814 A1 Apr. 1, 2004

(30) Foreign Application Priority Data
Sep. 25, 2002 (KR) .............. 10-2002-0058193
Sep. 26, 2002 (KR) .............. 10-2002-0058525

(51) Int. Cl.
*G02F 1/1335* (2006.01)

(52) U.S. Cl. .................... 349/64; 349/65

(58) Field of Classification Search ............ 349/58, 349/61–64, 65; 362/600, 602
See application file for complete search history.

(56) References Cited

U.S. PATENT DOCUMENTS

| 5,673,128 A | 9/1997 | Ohta et al. |
| 6,697,042 B1 * | 2/2004 | Cohen et al. ............. 345/102 |
| 6,697,130 B2 * | 2/2004 | Weindorf et al. .......... 349/65 |
| 6,781,648 B2 * | 8/2004 | Takahashi et al. ......... 349/68 |
| 7,239,792 B2 * | 7/2007 | Kim ........................ 385/125 |
| 2005/0088586 A1 * | 4/2005 | Mori et al. ............... 349/62 |

FOREIGN PATENT DOCUMENTS

| EP | 0 580 908 A1 * | 8/1992 |
| JP | 2001-210122 | 8/2001 |
| KR | 1996-29841 | 8/1996 |
| KR | 2002-60147 | 8/2001 |
| KR | 2002-56720 | 7/2002 |

* cited by examiner

*Primary Examiner*—Dung T. Nguyen
(74) *Attorney, Agent, or Firm*—Morgan, Lewis & Bockius LLP

(57) ABSTRACT

A backlight device for a liquid crystal display includes a substrate, and a plurality of white, red, green, and blue light emitting diodes arranged on the substrate.

9 Claims, 8 Drawing Sheets

BACKLIGHT DEVICE FOR LIQUID CRYSTAL DISPLAY AND METHOD OF FABRICATING THE SAME

The present invention claims the benefit of the Korean Patent Application No. P2002-58193 filed in Korea on Sep. 25, 2002, and Korean Patent Application No. P2002-58525 filed in Korea on Sep. 26, 2002, which are hereby incorporated by reference.

BACKGROUND OF THE INVENTION

1. Field of the Invention

The present invention relates to a display device and a method of fabricating a display device, and more particularly, to a backlight device of a liquid crystal display (LCD) and a method of fabricating a backlight device of a liquid crystal display.

2. Discussion of the Related Art

Cathode ray tubes (CRTs) have been commonly used as monitors for televisions, measuring devices, and information terminals. However, one problem of CRTs is their size and weight. Accordingly, display devices, such as liquid crystal display (LCD) devices that make use an electro-optics effect, plasma display panel (PDP) devices that make use of a gas discharge, and electro-luminescence display (ELD) devices that make use of an electro-luminescence effect, have been developed as replacements for the CRTs.

Among these display devices, the LCD devices appear most promising because of their low power consumption, thin profile, and light weight, and are currently employed as monitors for desktop and laptop computers and as large-sized display devices. The LCD devices include an LCD panel for displaying picture images, and a driving part for supplying a driving signal to the LCD panel. The LCD panel has first and second glass substrates bonded to each other to have a predetermined interval, and a liquid crystal material layer is injected between the first and second glass substrates.

On the first glass substrate (i.e., a TFT array substrate), there are a plurality of gate lines arranged along a first direction at fixed intervals, a plurality of data lines arranged along a second direction perpendicular to the gate lines at fixed intervals, a plurality of pixel electrodes in respective pixel regions defined by intersections of the gate and data lines in a matrix-type configuration, and a plurality of thin film transistors (TFTs) responsive to signals transmitted on the gate lines for supplying signals transmitted on the data lines to the pixel electrodes.

The second glass substrate (i.e., a color filter substrate) has a black matrix layer for shielding light from areas excluding the pixel regions, a color filter layer for displaying colored images, and a common electrode for implementing the picture images.

The predetermined interval between the first and second glass substrates is maintained by a plurality of spacers, and the first and second glass substrates are bonded by a sealant pattern having a liquid crystal injection inlet. Once the first and second substrates are bonded together using the sealant pattern, a liquid crystal material is injected through the liquid crystal injection inlet into the predetermined interval. Since the LCD device controls transmittance of ambient light to display image data (i.e., pictures), an additional light source is required, such as a backlight device. The backlight device is classified into a direct-type device and an edge-type device according to a position of a lamp unit.

Presently, various different types of light source devices, such as electroluminescence (EL) devices, light emitting diode (LED) devices, cold cathode fluorescent lamp (CCFL) devices, and hot cathode fluorescent lamp (HCFL) devices, are commonly used as a backlight device. Among these different types, the CCFL devices have long lifetimes, low power consumption, and thin profiles, and are commonly used as the light source for a large-sized color TFT LCD devices.

In CCFL devices, a fluorescent discharge tube is implemented for making use of the Penning effect, which is caused by injection of a hydrargyrum gas containing Argon Ar and Neon Ne at a low pressure. In addition, electrodes are formed at both ends of the fluorescent discharge tube, wherein a cathode electrode is formed having a plate-shape. When a voltage is applied to the electrodes, electric charges inside the fluorescent discharge tube collide against the plate-shaped cathode during a sputtering state, thereby generating secondary electrons. Thus, circumferential elements are excited by the secondary electrons, whereby a plasma is generated. In addition, the circumferential elements emit strong ultraviolet rays, wherein the ultraviolet rays excite a fluorescent substance, thereby emitting visible light.

In the edge-type device, a lamp unit is formed at one side of a light-guiding plate, and includes a lamp, a lamp holder, and a lamp reflecting plate. The lamp emitting light is inserted into both sides of the lamp holder, whereby the lamp is protected from external impact. In addition, the lamp reflecting plate covers a circumferential surface of the lamp, and one side of the lamp reflecting plate is inserted to one side of the light-guiding plate to reflect the light emitted from the lamp to the light-guiding plate. In general, the edge-type device is implemented in relatively small-sized LCD devices, such as monitors for laptop and desktop computers. The edge-type device provide for uniform luminance, maintaining a long lifetime, and thin profile.

In general, a multi-color LCD device includes an LCD panel, a backlight, and a color filter. The multi-color LCD device uses a backlight device with a fluorescent lamp that produces three wavelengths as a light source. A white light emitted from the backlight device is divided into red, green, and blue colors in the color filter, and the divided colors are re-mixed to display various colors. The colors of the light source are determined according to chromaticity coordinates of the Commission International De L'eclairage (C.I.E.). That is, tristimulus values X, Y, and Z are calculated from a spectrum of a predetermined light source, and then x, y and z chromaticity coordinates of red, green, and blue are calculated according to a conversion matrix. Subsequently, x and y values of the red, green, and blue are expressed as rectangular coordinates, so that U-shaped spectral locus is drawn, which is called a CIE chromaticity diagram. The general light source has the chromaticity coordinates inside the U-shaped spectral locus. At this time, a triangular space of the red, green, and blue chromaticity coordinates becomes a color realization space. As the triangular space increases, the color realization ratio increases. The color realization depends on color purity and luminance. As the color purity and the luminance increases, the color realization increases. The tristimulus values X, Y, and Z indicate weight of a color-matching function approaching to one spectrum. For example, the Y tristimulus values is a stimulus value of the brightness.

Color temperature represents a hue of a white color according to a color change of the light emitted by a temperature of a heat source. On a common display monitor, the color temperatures are 9300K, 6500K, and 5000K. As the color temperature approaches 9000K, the hue of the white color contains a blue color. Similarly, when the color temperature is 6500K, the hue of the white color contains a red color, and when the color temperature is 5000K, a neutral hue is generated. The color temperature is obtained from the chromaticity coordinates (x, y) of the white color, wherein as the color temperature approaches 9000K it satisfies European broadcasting union (EBU) standards.

In an LCD device, a luminous spectrum of the backlight device is coupled with the color-matching function and transmission spectrum of the color filter to determine the tristimulus values at each wavelength of the visible light region. In order to obtain the various colors, controlling of a correlation between the backlight device and color filter and the tristimulus values is necessary. For example, the luminous spectrum of the backlight device has to be controlled to optimize the color realization and the color temperature, and the transmission spectrum of the color filter has to be controlled to optimize luminosity.

To create the white light, it is necessary to simultaneously use red, green, and blue light emitting diodes (LEDs). However, simultaneous use of the red, green, and blue LEDs to create the white color light may have limited application for practical use. Accordingly, one LED emitting the three wavelengths at a predetermined intensity to generate the white light is needed. Thus, it is required to develop the backlight device using a cold cathode fluorescent lamp for portable devices, such as notebook computers to generate quality color realization, and surface mount devices (SMD) LED of a handphone for low power consumption and miniaturization.

FIG. 1 is a cross sectional view of a backlight assembly according to the related art. In FIG. 1, the backlight assembly includes a fluorescent lamp 1, a light-guiding plate 2, a light-diffusion substance 3, a reflecting plate 4, a light-diffusion plate 5, and a prism sheet 6. When a voltage is supplied to the fluorescent lamp 1, some electrons remaining in the fluorescent lamp 1 migrate to the anode, and remaining electrons collide with molecules of argon Ar gas to excite the argon Ar molecules. Accordingly, positive ions are generated that collide with the cathode to generate secondary electrons. When the secondary electrons are discharged to the fluorescent lamp 1, the flow of the electrons collides with hydrargyrum vapor and becomes ionized, thereby emitting both ultraviolet and visible light. Then, the emitted ultraviolet light excites a fluorescent substance deposited on an interior of the fluorescent lamp, thereby emitting light.

Subsequently, the light-guiding plate 2 is formed of Poly Methyl Meth Acrylate (PMMA) having a high light transmittance, and causes the light emitted from the fluorescent lamp 1 to be a plate-type light source. An amount of the light transmitted by the light-guiding plate 2 is related by a ratio of the light-guiding plate thickness and the fluorescent lamp diameter, a distance between the light-guiding plate and the fluorescent lamp 1, and the shape of the reflecting plate. In general, the fluorescent lamp 1 is positioned along an incline at a center of the light-guiding plate 2 along the thickness direction, thereby improving transmission efficiency of the light. The light-guiding plate 2 may be used as a backlight device of an LCD device, and may be categorized as a printing-type light-guiding plate, a V-cut type light-guiding plate, and a scattering-type light-guiding plate.

The light-diffusion substance 3 is comprised of $SiO_2$ particles, PMMA, and a solvent. Since the $SiO_2$ particles have a porosity, they are used for diffusing the light. In addition, PMMA is used for bonding the $SiO_2$ particles to a lower surface of the light guiding plate 2. The light-diffusion substance 3 is deposited on the lower surface of the light-guiding plate 2 in a dotted pattern, wherein the sizes of the dotted pattern gradually increase to obtain a uniform plate-type light source on an upper surface of the light-guiding plate 2. For example, the dotted pattern has a small size in a unit area near the fluorescent lamp 1, and the dotted pattern has a large size in a unit area apart from the fluorescent lamp 1.

The reflecting plate 4 is formed at the rear of the light-guiding plate 2, whereby the light emitted from the fluorescent lamp 1 is incident on the inside of the light-guiding plate 2. In addition, the light-diffusion plate 5 is formed on the upper surface of the light-guiding plate 2 upon which the dotted pattern is deposited, thereby obtaining a uniform luminance at different viewing angles. The light-diffusion plate 5 is formed of PET or poly-carbonate (PC) resin, and a particle-coating layer is formed on the light-diffusion plate 5 for diffusing the light.

The prism sheet 6 is formed to improve the front luminance of the light transmitted and reflected to the upper side of the light-diffusion plate 5. For example, the prism sheet 6 transmits the light of a predetermined angle, and the light incident on the other angles is totally reflected, whereby the light is reflected to the lower side of the prism sheet 6 by the reflecting plate 4 formed on the lower side of the light-guiding plate 2. The backlight assembly having the aforementioned structure is fixed to a mold frame, and a display unit disposed at an upper side of the backlight assembly is protected by a top sash. In addition, the backlight assembly and the display unit are received between the top sash and the mold frame being coupled to each other.

FIG. 2 is a cross sectional view of a backlight device using a fluorescent lamp according to the related art. In FIG. 2, the backlight unit includes a fluorescent lamp 11, a lamp housing 12, a light-guiding plate 13, a reflecting plate 14, a light-diffusion plate 15, a prism sheet 16, a protection sheet 17, and a main supporter 18. A fluorescent substance is coated on an interior of the fluorescent lamp 11 for emitting light, and the lamp housing 12 fixes the fluorescent lamp 11 and concentrates the light emitted from the fluorescent lamp 11 along one direction. The light-guiding plate 13 provides the light emitted from the fluorescent lamp 11 to an upper side of an LCD panel, and the reflecting plate 14 is bonded to a lower side of the light-guiding plate 13 to reflect the light leaking in an opposite side of the LCD panel to the light-guiding plate 13. The light-diffusion plate 15 is formed on an upper side of the light-guiding plate 13 to uniformly diffuse the light emitted from the light-guiding plate 13. In addition, the prism sheet 16 is formed on an upper side of the light-diffusion plate 15 to concentrate the light diffused in the light-diffusion plate 15 and to transmit the concentrated light to the LCD panel, and the protection sheet 17 is formed on an upper side of the prism sheet 16 to protect the prism sheet 16. The main supporter 18 receives and fixes the aforementioned elements.

In the aforementioned backlight device, the light emitted from the fluorescent lamp 11 is concentrated on an incident surface of the light-guiding plate 13, and then the concentrated light passes through the light-guiding plate 13, the light-diffusion plate 15 and the prism sheet 16, whereby the light is transmitted to the LCD panel. However, the backlight device using the fluorescent lamp has a low color realization ratio due to emitting characteristics of a light source. In addition, the backlight device does not have a high luminance due to limitations, such as size and capacity of the fluorescent lamp.

FIG. 3 is a cross sectional view of a backlight device using an LED according to the related art. In FIG. 3, LED light sources 22 are formed at both sides of a light-guiding plate 21 formed at a rear of an LCD panel to illuminate the LCD panel, so that it is possible to display images on a display screen in dark surroundings. The LED light source 22 is comprised of LED lamps 23 arranged along a one-dimensional structure in red, green, and blue order. The LED lamps 23 of the LED light source 22 are turned ON in order to display an image on the LCD panel. When a voltage is supplied to the red, green, and blue LED lamps 23, the three-colored LED lamps emit light that is scattered in the light-guiding plate 21, thereby generating a color mixture. As a result, the rear of the LCD panel is illuminated with white light.

FIG. 4 is a plan view of a backlight device using an LED according to the related art. In FIG. 4, the backlight unit includes LED lamps 23 and a light-guiding plate 21. The LED lamps 23 include red, green, and blue LED lamps 23a, 23b, and 23c, and the light-guiding plate 21 is formed at a rear of an LCD panel to uniformly diffuse the light emitted from the LED lamps 23 to the LCD panel. In order to emit white light using the LED lamps 23 as a light source, R, G, and B monochromatic light of the LED light source 22 (in FIG. 3) is emitted from the LED lamps 23. In a first area "a" of the light-guiding plate 21, a region 20 is created, wherein the different colored lights emitted from the respective LED lamps 23 do not overlap. Accordingly, it is not possible to create the uniform white light within the region 20. In a second area "b" of the light-guiding plate 21, R, G, and B monochromatic light emitted from the respective LED lamps 23 is mixed, thereby generating the uniform white light.

A luminous point is formed on the light-guiding plate 21 for effectively using the second area "b" of the light-guiding plate 21 in the backlight device, thereby using one-half of the light-guiding plate 21 spaced apart from the LED light source 22. By using the LED lamps 23 as the light source for illuminating the LCD panel, application in miniaturized and low power consumption devices, such as notebook-type personal computers, is possible. In addition, since the LED is a solid-state device, a DC voltage of 1.5V is supplied to the LED, whereby an AC-DC converter is not required. Accordingly, power consumption is greatly decreased. Furthermore, since the LED has greater reliability as compared to CRTs, the LED can be miniaturized and have a long lifetime.

However, using the backlight device in an LCD device is disadvantageous. For example, it is difficult to uniformly mix the red, green, and blue light emitted from the red, green, and blue LED lamps in order to emit the white light having a quality color realization ratio.

SUMMARY OF THE INVENTION

Accordingly, the present invention is directed to a backlight device of a liquid crystal display that substantially obviates one or more problems due to limitations and disadvantages of the related art.

An object of the present invention is to provide to a backlight device having an improved light efficiency and color realization ratio.

Another object of the present invention is to provide a method of fabricating a backlight device having an improved light efficiency and color realization ratio.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a backlight device for a liquid crystal display includes a substrate, and a plurality of white, red, green, and blue light emitting diodes arranged on the substrate.

In another aspect, a backlight device for a liquid crystal display includes a light-guiding plate disposed at a rear of a liquid crystal display panel of the liquid crystal display, at least one light source disposed along one side of the light-guiding plate, the light source including a plurality of light emitting diodes in order of white, red, green, and blue, a housing disposed adjacent to the light-guiding plate for concentrating white, red, green, and blue light emitted from the light source along a first light direction, and a reflecting plate disposed under the light-guiding plate for reflecting light leaking along a side of the liquid crystal display panel opposite to the light-guiding plate.

In another aspect, a backlight device for a liquid crystal display includes a main light-guiding plate disposed at a rear of a liquid crystal panel of the liquid crystal display, at least one sub light-guiding plate disposed adjacent to an incident surface along one side of the main light-guiding plate, at least one light source disposed along one side of the sub light-guiding plate, the light source includes a plurality of light emitting diodes in order of white, red, green, and blue, a housing adjacent to the light-guiding plate for concentrating white, red, green, and blue light emitted from the light source along a first light direction, and first and second reflecting plates disposed under the main light-guiding plate for reflecting light leaking along a side of the liquid crystal display panel opposite to the main light-guiding plate and the sub light-guiding plate.

In another aspect, a backlight device for a liquid crystal display includes a first light source including a plurality of green, blue, and red light emitting diodes disposed on a substrate according to a first arrangement order along a first row direction, and a second light source including a plurality of white light emitting diodes disposed on the substrate according to a second arrangement order along a second row direction, wherein the first row direction is different from the second row direction.

In another aspect, a backlight device for a liquid crystal display includes a light-guiding plate disposed at a rear of a liquid crystal display panel of the liquid crystal display, a first light source disposed along at least one side of the light-guiding plate, the first light source includes a plurality of green, blue, and red light emitting diodes arranged along a first row direction, a second light source disposed along at least the one side of the light-guiding plate, the second light source includes a plurality of white light emitting diodes arranged along a second row direction different from the first row direction, a housing affixing the first and second light sources and concentrating light emitted from the first and second light sources along a first light direction, and a reflecting plate disposed under the light-guiding plate for reflecting light leaking along a side of the liquid crystal display panel opposite to the light-guiding plate.

In another aspect, a backlight device for a liquid crystal display includes a main light-guiding plate disposed at a rear of a liquid crystal display panel of the liquid crystal display, a sub light-guiding plate disposed on an incident surface along one side of the main light-guiding plate, a first light source disposed along at least one side of the sub light-guiding plate, the first light source includes a first periodic repeating order of a plurality of green, blue, and red light emitting diodes along a first row direction, a second light source disposed along at least the one side of the sub light-guiding plate, the second light source includes a second periodic repeating order of a plurality of white light emitting diodes along a second row direction different from the first row direction, a housing adjacent to the main light-guiding plate affixing the first and second light sources and concentrating light emitted from the first and second light sources along a first light direction, and first and second reflecting plates disposed under the main light-guiding plate for reflecting light leaking along a side of the liquid crystal display panel.

In another aspect, a method of fabricating a backlight device for a liquid crystal display includes forming a light-guiding plate at a rear of a liquid crystal display panel of the liquid crystal display, forming at least one light source along one side of the light-guiding plate, the light source including a plurality of light emitting diodes in order of white, red, green, and blue, forming a housing adjacent to the light-guiding plate for concentrating white, red, green, and blue light emitted from the light source along a first light direction, and forming a reflecting plate under the light-guiding plate for reflecting light leaking along a side of the liquid crystal display panel opposite to the light-guiding plate.

In another aspect, a method of fabricating a backlight device for a liquid crystal display includes forming a main light-guiding plate at a rear of a liquid crystal display panel of the liquid crystal display, forming at least one sub light-guiding plate adjacent to an incident surface along one side of the main light-guiding plate, forming at least one light source along one side of the sub light-guiding plate, the light source includes a plurality of light emitting diodes in order of white, red, green, and blue, forming a housing along the main light-guiding plate for concentrating white, red, green, and blue light emitted from the light source along a first light direction, and forming first and second reflecting plates under the main light-guiding plate for reflecting light leaking along a side of the liquid crystal display panel opposite to the main light-guiding plate and the sub light-guiding plate.

In another aspect, a method of fabricating a backlight device for a liquid crystal display includes forming a first light source including a plurality of green, blue, and red light emitting diodes on a substrate according to a first arrangement order along a first row direction, and forming a second light source including a plurality of white light emitting diodes on the substrate according to a second arrangement order along a second row direction, wherein the first row direction is different from the second row direction.

In another aspect, a method of fabricating a backlight device for a liquid crystal display includes forming a light-guiding plate at a rear of a liquid crystal display panel of the liquid crystal display, forming a first light source along at least one side of the light-guiding plate, the first light source includes a plurality of green, blue, and red light emitting diodes arranged along a first row direction, forming a second light source along at least the one side of the light-guiding plate, the second light source includes a plurality of white light emitting diodes arranged along a second row direction different from the first row direction, forming a housing adjacent to the light-guiding plate for affixing the first and second light sources and concentrating light emitted from the first and second light sources along a first light direction, and forming a reflecting plate under the light-guiding plate for reflecting light leaking along a side of the liquid crystal display panel opposite to the light-guiding plate.

In another aspect, a method of fabricating a backlight device for a liquid crystal display includes forming a main light-guiding plate at a rear of a liquid crystal display panel of the liquid crystal display, forming a sub light-guiding plate on an incident surface along one side of the main light-guiding plate, forming a first light source along at least one side of the sub light-guiding plate, the first light source includes a first periodic repeating order of a plurality of green, blue, and red light emitting diodes along a first row direction, forming a second light source along at least the one side of the sub light-guiding plate, the second light source includes a second periodic repeating order of a plurality of white light emitting diodes along a second row direction different from the first row direction, forming a housing adjacent to the main light-guiding plate for affixing the first and second light sources and concentrating light emitted from the first and second light sources along a first light direction, and forming first and second reflecting plates under the main light-guiding plate for reflecting light leaking along a side of the liquid crystal display panel.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a backlight unit of an LCD device according to the present invention will be described with reference to the accompanying drawings.

Figure 1:
FIG. 1 is a cross sectional view of a backlight assembly according to the related art.
Figure 1:
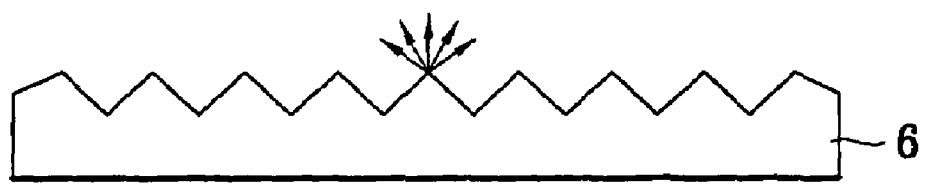
Figure 1:
Figure 1:
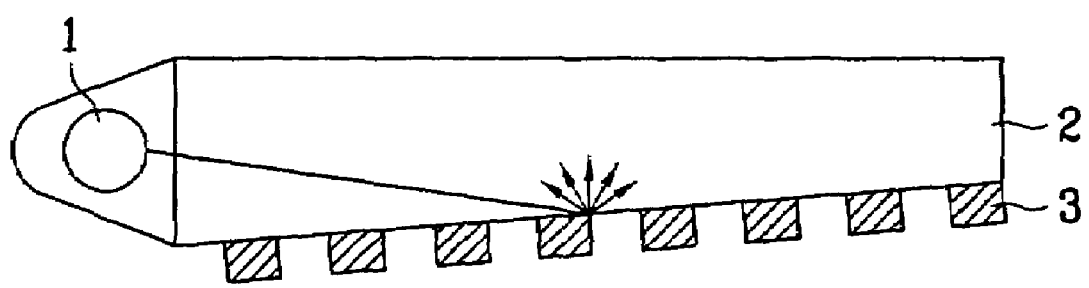
Figure 1:
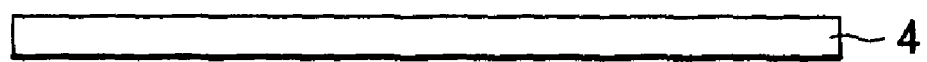
Figure 2:
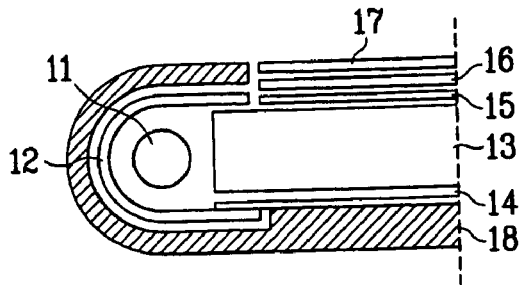
FIG. 2 is a cross sectional view of a backlight device using a fluorescent lamp according to the related art.
Figure 3:
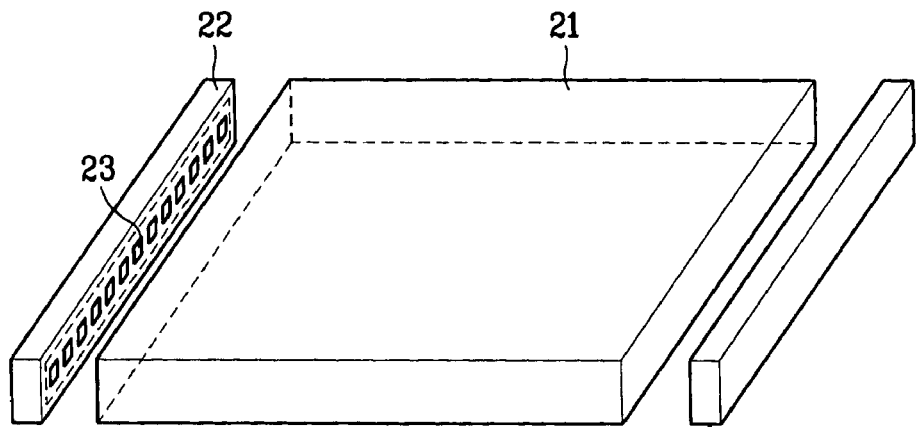
FIG. 3 is a cross sectional view of a backlight device using an LED according to the related art.
Figure 4:
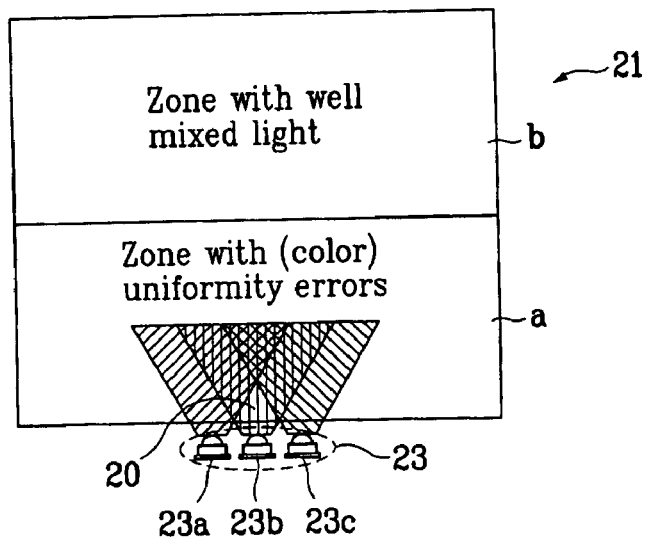
FIG. 4 is a plan view of a backlight device using an LED according to the related art.
Figure 5:
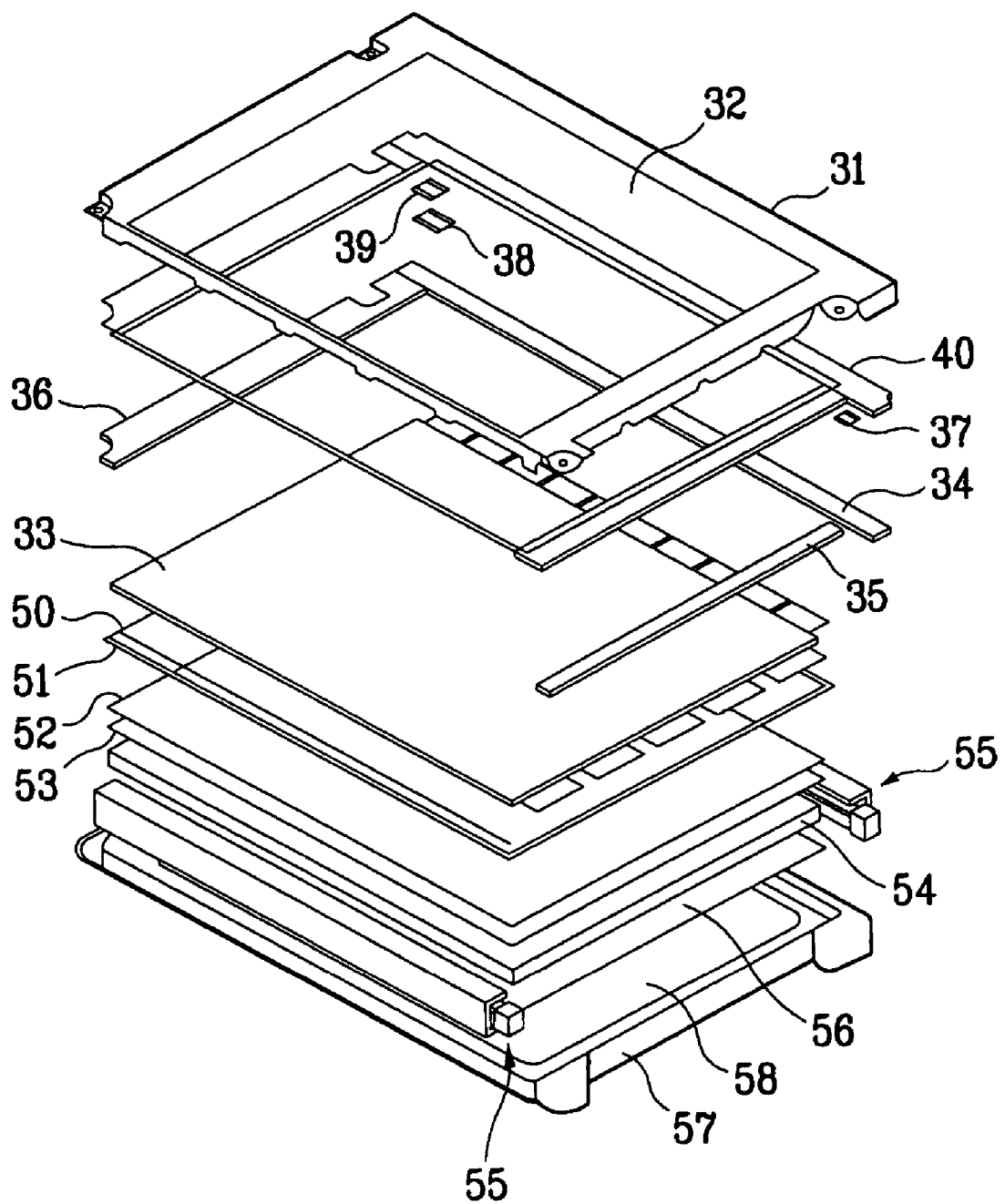
FIG. 5 is a perspective view of an exemplary LCD device according to the present invention.

FIG. 5 is a perspective view of an exemplary LCD device according to the present invention. In FIG. 5, an LCD device may include a metal shield case 31 for forming an upper frame, and a display window 32 for forming an effective screen of an LCD module. An LCD panel 33 may be formed below the shield case 31 and the display window 32, and the LCD panel 33 may include a thin film transistor (TFT) having source and drain electrodes, a gate electrode, and an amorphous silicon layer, and a color filter between two glass substrates. In addition, the LCD panel 33 may include a drain circuit substrate 34, a gate circuit substrate 35, an interface circuit substrate 36, and joiners 37, 38, and 39 for joining the circuit substrates together. The circuit substrates 34, 35, and 36 may be affixed to the shield case 31 by an insulating sheet 40.

A light-shielding space 51 may be formed beneath the LCD panel 33 by a rubber cushion 50, and a light-diffusion plate 52 and a prism sheet 53 may be sequentially formed below the LCD panel 33. The light-diffusion plate 52 may be formed to diffuse light guided by a light-guiding plate, thereby obtaining a uniform plate-type light. In addition, the prism sheet 53 may be formed for improving luminance along a front direction, wherein the light-guiding plate 54 may be formed beneath the prism sheet 53, and fluorescent tube units 55 may be positioned along two sides of the light-guiding plate 54. Furthermore, a reflecting plate 56 may be formed beneath the light-guiding plate 54 to reflect the light incident on the light-guiding plate 54 from the fluorescent tube unit 55 toward the LCD panel 33. A lower case 57 may include an opening 58 formed under the reflecting plate 56. Although not shown, the fluorescent tube unit 55 may include a fluorescent lamp and a lamp housing, wherein the lamp housing may concentrate the light emitted from the fluorescent lamp along one direction.

Figure 6:
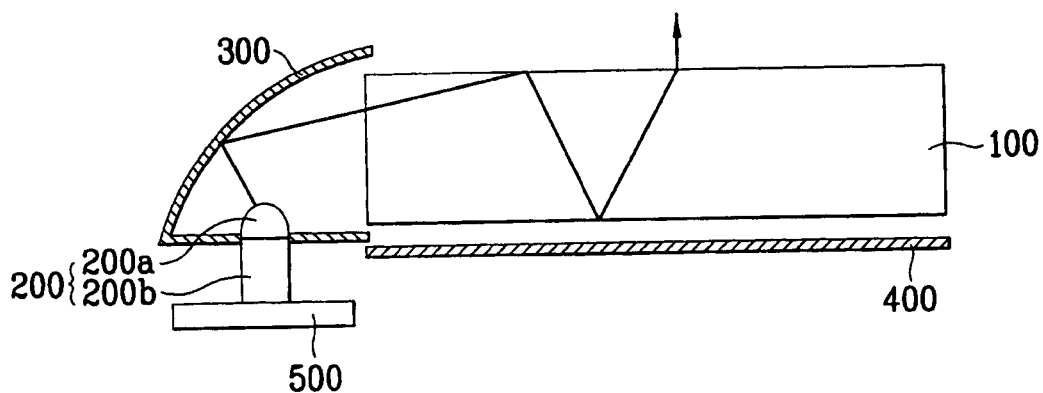
FIG. 6 is a cross sectional view of an exemplary backlight device according to the present invention.

FIG. 6 is a cross sectional view of an exemplary backlight device according to the present invention. In FIG. 6, a backlight device may include a light-guiding plate 100, a light source 200, a housing 300, and a reflecting plate 400, wherein the light-guiding plate 100 may be formed at a rear of an LCD panel 33 (in FIG. 5). In addition, the light source 200 may be formed along one side of the light-guiding plate 100, in which a plurality of white W, red R, green G, and blue B LEDs may be sequentially arranged for emitting light. The housing 300 may function to concentrate the white W, red R, green G, and blue B light emitted from the light source 200 along one direction, and the reflecting plate 400 may be formed under the light-guiding plate 100 to reflect the light leaking along an opposite side of the LCD panel to the light-guiding plate 100.

In FIG. 6, the light source 200 may be disposed on a substrate 500, such as a printed circuit board, by sequentially arranging the W, R, G, and B LEDs along one dimension, and each LED may include a body part 200b and a light-emitting part 200a. In addition, the housing 300 may surround the light-emitting parts 200a of the respective LEDs arranged on the substrate 500, and the housing 300 may include aluminum Al.

During a display mode of the LCD device using the backlight device, the W, R, G, and B LEDs of the light source 200 emit light, wherein the white W, red R, green G, and blue B light emitted from the respective LEDs may be incident on the light-guiding plate 100. Then, the white W, red R, green G, and blue B light may be scattered in the light-guiding plate 100, thereby mixing the white W, red R, green G, and blue B light. As a result, the white light may be emitted from an entire surface of the light-guiding plate 100, thereby illuminating an entire surface of the LCD panel with the white light. Then, the white light indent on the LCD panel may be changed according to an alignment direction of liquid crystal molecules, and transmitted through the color filter to produce color images.

Figure 7:
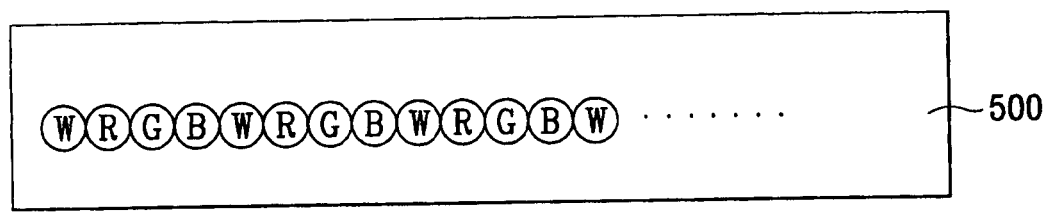
FIG. 7 is a plan view of an exemplary arrangement of LEDs in a backlight device according to the present invention.

FIG. 7 is a plan view of an exemplary arrangement of LEDs in a backlight device according to the present invention. In FIG. 7, a plurality of LEDs may be sequentially arranged in order of white W, red R, green G, and blue B LEDs on a substrate 500, such as a printed circuit board, to emit white W, red R, green G, and blue B light. Accordingly, light efficiency and color realization ratio are greatly improved since the backlight device includes the white W LED.

Figure 8:
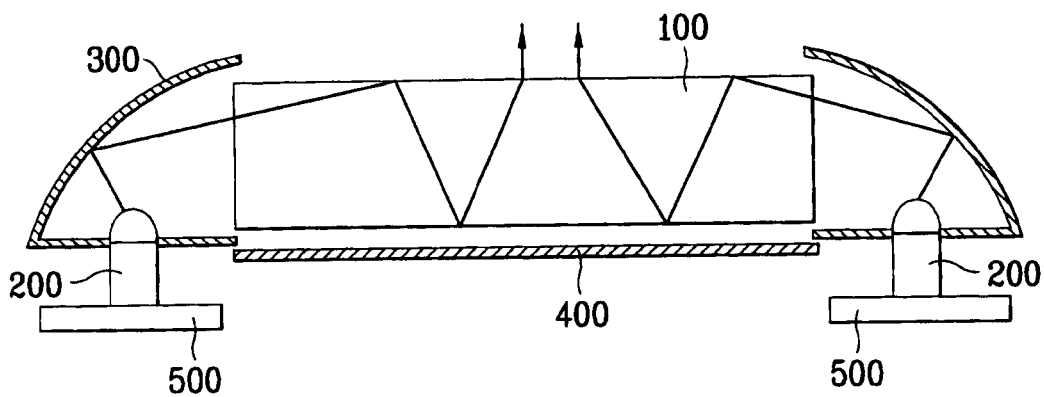
FIG. 8 is a cross sectional view of another exemplary backlight device according to the present invention.

FIG. 8 is a cross sectional view of another exemplary backlight device according to the present invention. In FIG. 8, a backlight device may include a light-guiding plate 100, light sources 200, a housing 300, and a reflecting plate 400, wherein the light-guiding plate 100 may be formed at a rear of an LCD panel 33 (in FIG. 5). In addition, the light sources 200 may be formed along both sides of the light-guiding plate 100, in which a plurality of LEDs are arranged in order of white W, red R, green G, and blue B LEDs for emitting light. The housing 300 may concentrate the white W, red R, green G, and blue B light emitted from the light source 200 along one direction, and the reflecting plate 400 may be formed under the light-guiding plate 100 to reflect the light leaking in an opposite side of the LCD panel to the light-guiding plate 100.

The light source 200 may be formed on a substrate 500, such as a printed circuit board, for sequentially arranging the W, R, G, and B LEDs along one dimension. Accordingly, the backlight devices of FIGS. 6 and 8 may have similar structures except that the light sources 200 in FIG. 8 may be formed along both sides of the light-guiding plate 100. Thus, the backlight device of FIG. 8 provides improved light efficiency and color realization ratio.

Figure 9:
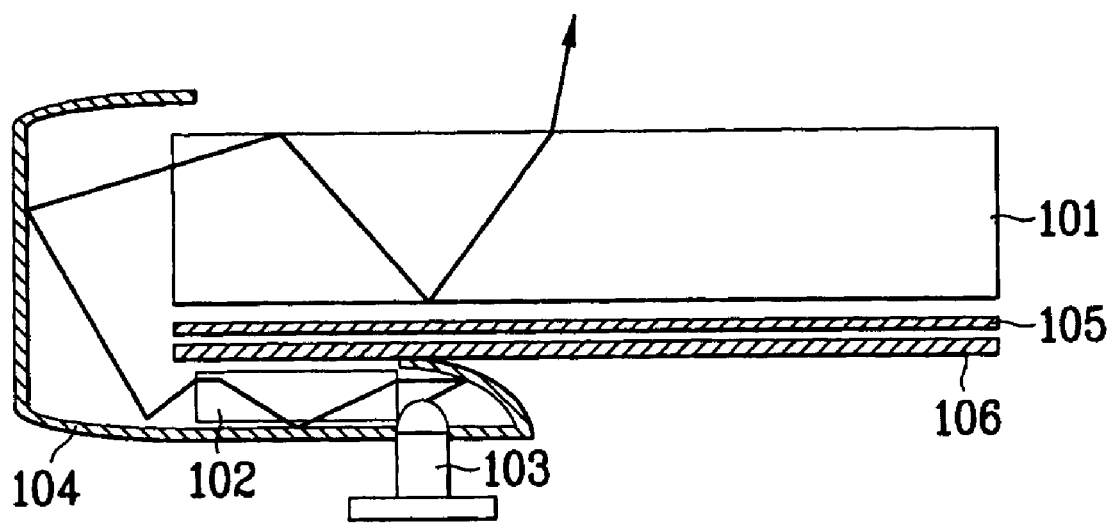
FIG. 9 is a cross sectional view of another exemplary backlight device according to the present invention.

FIG. 9 is a cross sectional view of another exemplary backlight device according to the present invention. In FIG. 9, a backlight device may include a main light-guiding plate 101, a sub light-guiding plate 102, a light source 103, a housing 104, and first and second reflecting plates 105 and 106. The main light-guiding plate 101 may be formed at a rear of an LCD panel 33 (in FIG. 5), and the sub light-guiding plate 102 may be formed in an incident region along one side of the main light-guiding plate 101. In addition, the light source 103 may be formed along one side of the sub light-guiding plate 102 to include a plurality of LEDs arranged in an order of white W, red R, green G, and blue B LEDs for emitting light. The housing 104 may concentrate the white W, red R, green G, and blue B light emitted from the light source 103 along one direction, and the first and second reflecting plates 105 and 106 may be formed under the main light-guiding plate 101 to reflect the light leaking in an opposite side of the LCD panel to the main and sub light-guiding plates 101 and 102.

The light source 103 may be formed on a substrate (not shown), such as a printed circuit board, for sequentially arranging the W, R, G, and B LEDs along one dimension, and the second reflecting plate 106 may include aluminum Al coated with silver Ag to obtain improved reflectivity. In addition, the sub light-guiding plate 102 may be formed on an incident part at another side of the main light-guiding plate 101, and the housing 104 may concentrate the white light emitted through the sub light-guiding plate 102 on the main light-guiding plate 101.

Accordingly, the backlight devices of FIGS. 6, 8, and 9 may have similar structures except for the sub light-guiding plate 102 and the second reflecting plate 106. Thus, in FIG. 9, the sub light-guiding plate 102 may receive the respective color light from the light source 103, and emit the white light by mixing the respective color light. As a result, it is possible to optimize the color mixture of the white light emitted through the main light-guiding plate 101, thereby obtaining improved color division of the incident part and luminance. In addition, the second reflecting plate 106 may be formed to prevent the light transmitting the sub light-guiding plate 102 from leaking.

Figure 10:
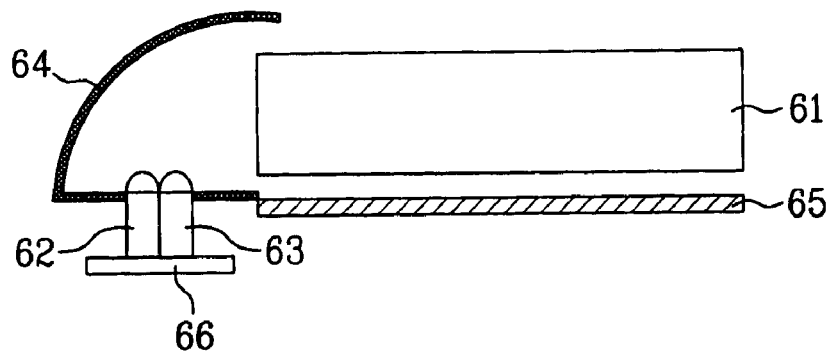
FIG. 10 is a cross sectional view of another exemplary backlight device according to the present invention.

FIG. 10 is a cross sectional view of another exemplary backlight device according to the present invention. In FIG. 10, a backlight device may include a light-guiding plate 61, a first light source 62, a second light source 63, a housing 64, and a reflecting plate 65, wherein the light-guiding plate 61 may be formed at a rear of an LCD panel 33 (in FIG. 5). The first light source 62 may be formed along one side of the light-guiding plate 61, in which a plurality of LEDs may be linearly arranged in an order of green G, blue B, and red R LEDs along a single row. The second light source 63 may be linearly arranged along a different row from the first light source 62, in which a plurality of white LEDs may be arranged along a single row. In addition, the housing 64 may affix the first and the second light sources 62 and 63, and may concentrate the light emitted from the first and second light sources 62 and 63 along one direction. The reflecting plate 65 may be formed under the light-guiding plate 61 to reflect the light leaking in an opposite side of the LCD panel. The first and second light sources 62 and 63 may be formed on a common substrate 66, such as a printed circuit board, and the housing 64 that surrounds the light-emitting parts of the respective LEDs on the substrate 66 may include aluminum Al.

When the respective LEDs of the first and second light sources 62 and 63 emit light, wherein the green G, blue B, and red R light are emitted from the first light source 62 and the white W light is emitted from the second light source 63, incident on the light-guiding plate 61, and the light is scattered in the light-guiding plate 61 and mixed together. As a result, the white light is emitted from an entire surface of the light-guiding plate 61, thereby illuminating an entire surface of the LCD panel with the white light. Then, the white light incident on the LCD panel may be changed according to an alignment direction of liquid crystal molecules, and may be transmitted through the color filter to produce color images.

On the substrate 66, the plurality of red R, green G, and blue B LEDs may be arranged along one dimension (i.e., a single first row), thereby forming the first light source 62. Simultaneously, the plurality of white W LEDs may be arranged along one dimension (i.e., a single second row), thereby forming the second light source 63. Thus, a total number of the light sources used in a unit length may increase, thereby improving light efficiency. In addition, the housing 64 may convert dotted-type light sources emitted from the respective LEDs into linear-type light sources, thereby improving concentration of the light. Moreover, the substrate 66 having the first and second light sources 62 and 63 may be formed perpendicularly to the light-guiding plate 62 instead of being formed parallel to the light-guiding plate 61.

Figure 11:
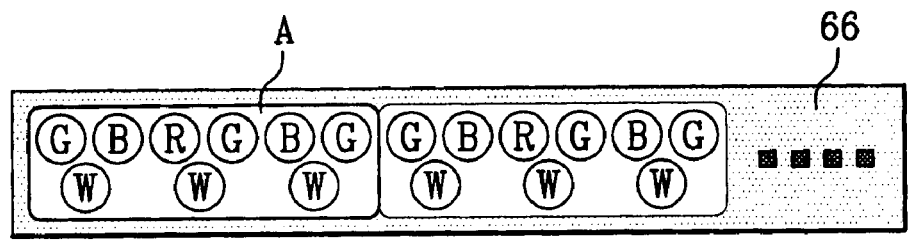
FIG. 11 is a plan view of another exemplary arrangement of LEDs in a backlight device according to the present invention.

FIG. 11 is a plan view of another exemplary arrangement of LEDs in a backlight device according to the present invention. In FIG. 11, a plurality of green G, blue B, and red R LEDs may be arranged on a substrate 66, such as a printed circuit board, along one dimension, thereby forming a first light source 62 (in FIG. 10). Then, white W LEDs may be arranged along one dimension in a different row from the first light source 62 (in FIG. 10) to correspond to portions of the first light source 62 (in FIG. 10) between the green G and blue B LEDs, between the red R and green G LEDs, and between the blue B and green G LEDs, thereby forming the second light source 63 (in FIG. 10). In addition, the first and second light sources 62 and 63 may be grouped into a plurality of blocks A, wherein each block A may include six LEDs in a periodic repeating order of G→B→R→G→B→G LEDs along one dimension in the first light source 62 (in FIG. 10), and three white W LEDs in the second light source 63 (in FIG. 10) to correspond to the portions between the green G and blue B LEDs, between the red R and green G LEDs, and between the blue B and green G LEDs.

Figure 12:
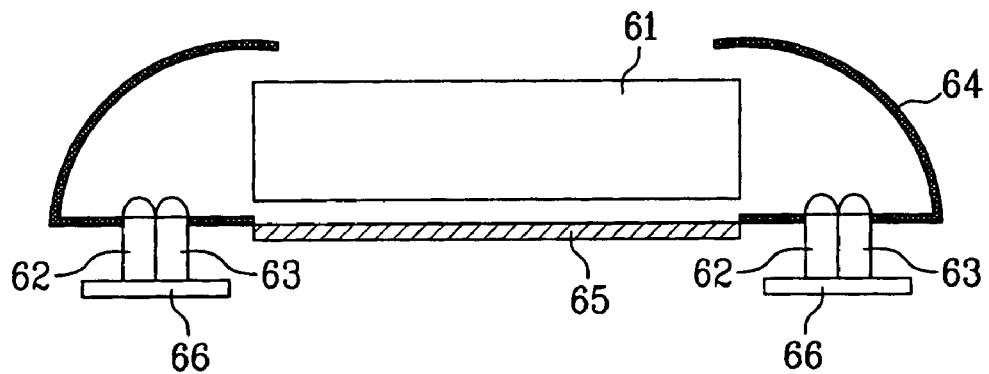
FIG. 12 is a cross sectional view of another exemplary backlight device according to the present invention.

FIG. 12 is a cross sectional view of another exemplary backlight device according to the present invention. In FIG. 12, a backlight device may include a light-guiding plate 61, first light sources 62, second light sources 63, a housing 64, and a reflecting plate 65, wherein the light-guiding plate 61 may be formed at a rear of an LCD panel 33 (in FIG. 5). The first light sources 62 may be formed along both sides of the light-guiding plate 61 for emitting light, in which a plurality of LEDs may be arranged in order of green G, blue B, and red R LEDs along one dimension. The second light sources 63 may be formed along different rows from the first light sources 62, in which a plurality of LEDs may be arranged along one dimension. In addition, the housing 64 may affix the first and the second light sources 62 and 63, and may concentrate the light emitted from the first and second light sources 62 and 63 along one direction. The reflecting plate 65 may be formed under the light-guiding plate 61 to reflect the light leaking in an opposite side of the LCD panel. The first and second light sources 62 and 63 may be formed on a common substrate 66, such as a printed circuit board, and the housing 64 may surround light-emitting parts of the respective LEDs on the substrate 66 and may include aluminum Al.

Figure 13:
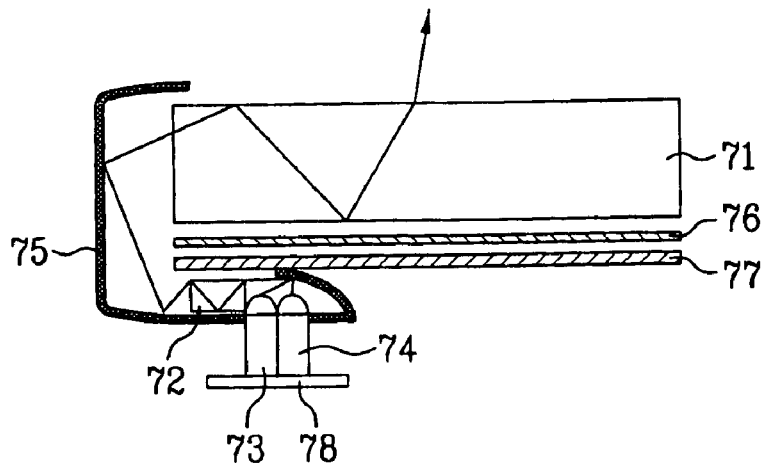
FIG. 13 is a cross sectional view of another exemplary backlight device according to the present invention.

FIG. 13 is a cross sectional view of another exemplary backlight device according to the present invention. In FIG. 13, a backlight device may include a main light-guiding plate 71, a sub light-guiding plate 72, a first light source 73, a second light source 74, a housing 75, and first and second reflecting plates 76 and 77, wherein the main light-guiding plate 71 may be formed at a rear of an LCD panel 33 (in FIG. 5), and the sub light-guiding plate 72 may be formed on an incident surface along one side of the main light-guiding plate 71. The first light source 73 may be formed along one side of the sub light-guiding plate 72 by arranging a plurality LEDs in order of green G, blue B, and red R LEDs along one dimension, and the second light source 74 may be formed along a different row from the first light source 73 by arranging a plurality of white W LEDs along one dimension. In addition, the housing 75 may affix the first and second light sources 73 and 74, and may concentrate the light emitted from the first and second light sources 73 and 74 along one direction. The first and second reflecting plates 76 and 77 may be formed under the main light-guiding plate 71 to reflect the light leaking in an opposite side of the LCD panel. The first and second light sources 73 and 74 may be formed on a common substrate 78, such as a printed circuit board, and the second reflecting plate 77 may include aluminum Al coated with silver Ag to improve reflectivity. In addition, the housing 75 that surrounds light-emitting parts of the respective LEDs on the PCB substrate 78 may include aluminum Al.

When the LEDs of the first and second light sources 62 and 63 emit light incident on the sub light-guiding plate 72, it is scattered in the sub light-guiding plate 72 to mix the light. As a result, the white light is emitted to the incident surface of the main light-guiding plate 72, and the white light is emitted from an entire surface of the main light-guiding plate 71, thereby illuminating an entire surface of the LCD panel with the white light. Then, the white light incident on the LCD panel may be changed according to an alignment direction of liquid crystal molecules and may be transmitted through the color filter to produce color images.

In the present invention, the backlight devices supply light using an edge-type configuration. However, it is possible to supply light using a direct-type configuration using the backlight devices according to the present invention. For example, by arranging the plurality of white W, red R, green G, and blue B LEDs on the entire surface of the substrate 66 or 78, the substrate 66 or 78 may be positioned at a lower portion of the light-guiding plate 61 or 71, thereby directly illuminating the LCD panel.

Figure 14:
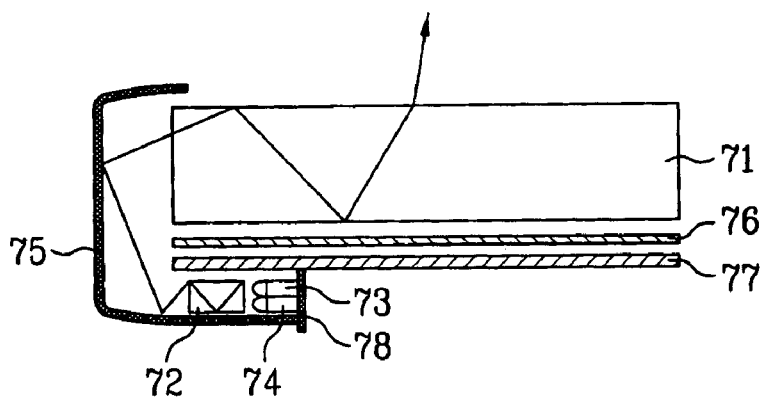
FIG. 14 is a cross sectional view of another exemplary backlight device according to the present invention.

FIG. 14 is a cross sectional view of another exemplary backlight device according to the present invention. In FIG. 14, first and second light sources 73 and 74 may be directly bonded to a substrate 78, such as a printed circuit, to be perpendicular to the first and second light sources 73 and 74. For example, the substrate 78 may be arranged perpendicular to surfaces of first and second reflecting plates 76 and 77, thereby maximizing light efficiency.

Figure 15:
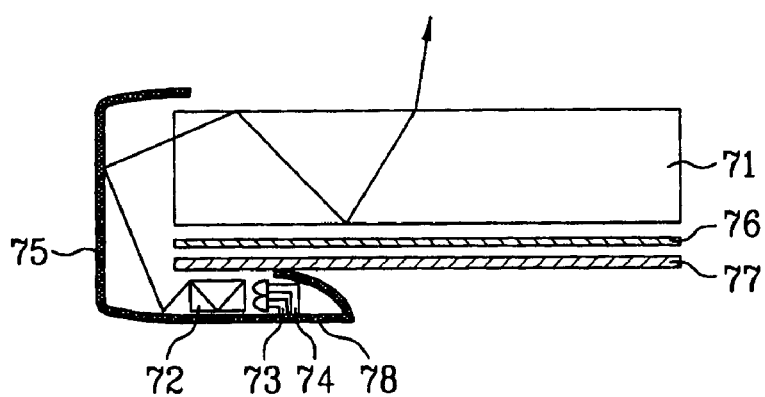
FIG. 15 is a cross sectional view of another exemplary backlight device according to the present invention.

FIG. 15 is a cross sectional view of another exemplary backlight device according to the present invention. In FIG. 15, first and second light sources 73 and 74 may be arranged to have their electrodes bent at a predetermined angle, and bonded to a substrate 78 to be parallel to the first and second light sources 73 and 74. For example, a lead frame and a cathode of the LED may be formed at an exterior of a dome-shaped light-emitting part. Accordingly, the lead frame and the cathode may be easily bent, whereby light efficiency is maximized and an external size of the backlight device decreases.

Figure 16:
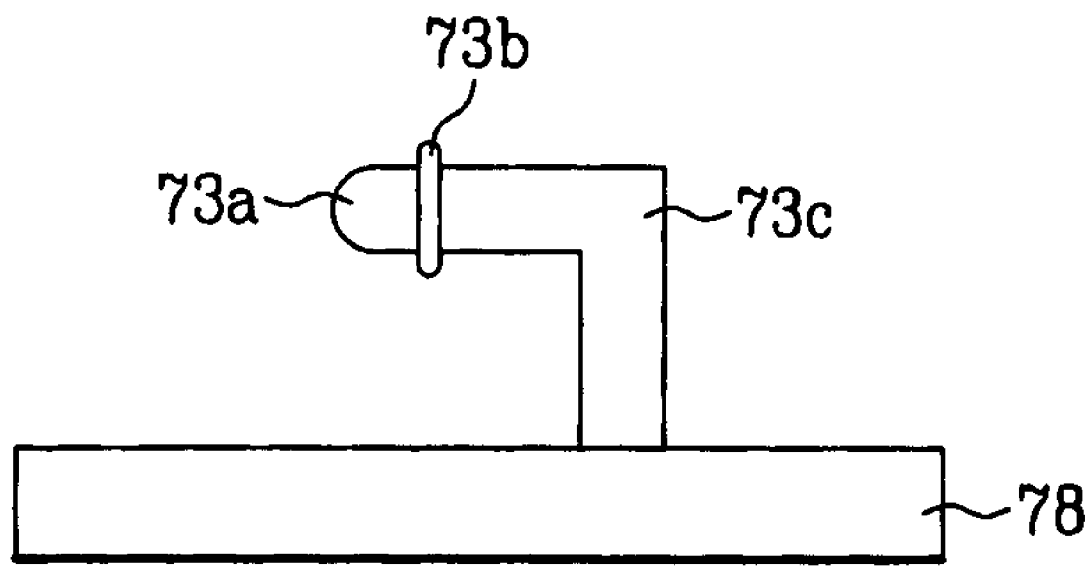
FIG. 16 is a cross sectional view of another exemplary arrangement of LEDs according to the present invention.

FIG. 16 is a cross sectional view of another exemplary arrangement of LEDs according to the present invention. In FIG. 16, an LED may include a light-emitting part 73a, a cathode 73b, and a lead frame 73c. The light-emitting part may include a light-emitting chip and a transparent mold, and the cathode 73b may have a larger size than the light-emitting part 73a. The lead frame 73c may be connected to both sides of the cathode 73b, and the lead frame 73c may be bent at an angle and may be bonded to a substrate 78, such as a printed circuit board, by soldering.

It will be apparent to those skilled in the art that various modifications and variations can be made in the backlight device for liquid crystal display and method of fabricating a backlight device of the present invention without departing from the spirit or scope of the invention. Thus, it is intended that the present invention cover the modifications and variations of this invention provided they come within the scope of the appended claims and their equivalents.

What is claimed is:

1. A backlight device for a liquid crystal display, comprising:
   a light-guiding plate disposed at a rear of a liquid crystal display panel of the liquid crystal display;
   a common substrate parallel to the light-guiding plate;
   a plurality of white, red, green, and blue light emitting diodes arranged on the common substrate; and
   a housing to concentrate white, red, green, and blue lights emitted from the plurality of light emitting diodes along one direction, wherein the common substrate is disposed at a rear of the housing,
   wherein the plurality of white, red, green, and blue light emitting diodes are sequentially disposed in an order of white, red, green, and blue, and each of the plurality of light emitting diodes has light-emitting portions disposed inside the housing and body portions disposed outside the housing such that the housing surrounds the light-emitting portions of the plurality of light emitting diodes, and
   wherein upper surface and one side surface of the light-emitting portions of the plurality of light emitting diodes are opposite to the housing, and other side surface of the light-emitting portions of the plurality of light emitting diodes is opposite to a light-incidence surface of the light-guiding plate.

2. The device according to claim 1, wherein the white light emitting diodes are disposed between the blue and red light emitting diodes.

3. A backlight device for a liquid crystal display, comprising:
   a light-guiding plate disposed at a rear of a liquid crystal display panel of the liquid crystal display;
   a common substrate parallel to the light-guiding plate;
   at least one light source disposed along one side of the light-guiding plate on the common substrate, the light source including a plurality of light emitting diodes in order of white, red, green, and blue;
   a housing disposed adjacent to the light-guiding plate for concentrating white, red, green, and blue light emitted from the light source along a first light direction, wherein the common substrate is disposed at a rear of the housing; and
   a reflecting plate disposed under the light-guiding plate for reflecting light leaking along a side of the liquid crystal display panel opposite to the light-guiding plate,
   wherein each of the plurality of light emitting diodes has light-emitting portions disposed inside the housing and body portions disposed outside the housing such that the housing surrounds the light-emitting portions of the plurality of light emitting diodes, and
   wherein upper surface and one side surface of the light-emitting portions of the plurality of light emitting diodes are opposite to the housing, and other side surface of the light-emitting portions of the plurality of light emitting diodes is opposite to a light-incidence surface of the light-guiding plate.

4. The device according to claim 3, wherein the light sources are disposed along two opposing sides of the light-guiding plate.

5. The device according to claim 3, wherein the housing includes aluminum.

6. The device according to claim 3, wherein the housing is disposed between the light-emitting portions and the body portions of the plurality of light emitting diodes.

7. A method of fabricating a backlight device for a liquid crystal display, comprising:
   forming a light-guiding plate at a rear of a liquid crystal display panel of the liquid crystal display;
   forming a common substrate parallel to the light-guiding plate;
   forming at least one light source along one side of the light-guiding plate on the common substrate, the light source including a plurality of light emitting diodes in order of white, red, green, and blue;
   forming a housing adjacent to the light-guiding plate for concentrating white, red, green, and blue light emitted from the light source along a first light direction, wherein the common substrate is disposed at a rear of the housing; and
   forming a reflecting plate under the light-guiding plate for reflecting light leaking along a side of the liquid crystal display panel opposite to the light-guiding plate.

wherein each of the plurality of light emitting diodes has a portion disposed inside the housing and a portion disposed outside the housing, wherein each of the plurality of light emitting diodes has light-emitting portions disposed inside the housing and body portions disposed outside the housing such that the housing surrounds the light-emitting portions of the plurality of light emitting diodes, and wherein upper surface and one side surface of the light-emitting portions of the plurality of light emitting diodes are opposite to the housing, and other side surface of the light-emitting portions of the plurality of light emitting diodes is opposite to a light-incidence surface of the light-guiding plate.

8. The method according to claim 7, wherein the forming of at least one light source includes forming a plurality of the light sources along two opposing sides of the light-guiding plate.

9. The method according to claim 7, wherein the housing is disposed between the light-emitting portions and the body portions of the plurality of light emitting diodes.

* * * * *